UNITED STATES PATENT OFFICE.

RANDALL FISH, OF WASHINGTON, DISTRICT OF COLUMBIA.

IMPROVED ARTIFICIAL FUEL.

Specification forming part of Letters Patent No. 53,431, dated March 27, 1866.

*To all whom it may concern:*

Be it known that I, RANDALL FISH, of Washington, in the District of Columbia, have invented a new and useful Composition of Matter for Use as an Artificial Fuel; and I do hereby declare that the following is a full, clear, and exact description of the mode of compounding and preparing the same.

I use as the basis of my composition all kinds of coal, in dust or lumps, sawdust, shavings, or other refuse of wood or any other inflammable vegetable or mineral substance.

I shall proceed particularly to describe the mode of compounding artificial fuel from coal-dust, the other articles mentioned being used in the same manner. To one hundred parts, by weight, of coal-dust I add twelve parts of cobalt or hydraulic cement; add twelve parts of clean white sand, three parts of sweet flour made into a paste, and one part of rosin. Mix with water and incorporate into a thick mortar. The material thus prepared has about the consistency of clay prepared for making brick. I form it in molds into blocks of suitable size. When lumps of any considerable size are desired I use in preparing it a mold having a movable bottom from which pins project, onto which presses a piston with corresponding perforations. The number of these pins depends upon the size of the lumps, and for small lumps they may be dispensed with entirely. The lumps thus manufactured will have holes through them corresponding to the projecting pins, the object of which is to facilitate combustion and drying. When the lumps thus formed are removed from the molds they are dried by natural or artificial heat and are ready for use.

Having fully explained the composition and mode of manufacturing my artificial fuel, what I claim as my invention, and seek to secure by Letters Patent, is—

A composition of matter for use as a fuel, compounded and prepared substantially in the manner set forth from the ingredients named or their equivalents.

In testimony whereof I have signed my name to this specification in the presence of two subscribing witnesses.

RANDALL FISH.

Witnesses:
JOHN D. BLOOR,
JOHN S. HOLLINGSHEAD.